W. ANDERLE.
Draft Equalizer.

No. 238,828. Patented March 15, 1881.

Witnesses
Nat. E. Oliphant
A. G. Huylmun

Inventor
Wesley Anderle
By [signature]
Attorney

UNITED STATES PATENT OFFICE.

WESLEY ANDERLE, OF NORTH LIBERTY, IOWA, ASSIGNOR OF ONE-HALF TO JOHN ANDERLE, OF SAME PLACE.

DRAFT-EQUALIZER.

SPECIFICATION forming part of Letters Patent No. 238,828, dated March 15, 1881.

Application filed January 8, 1880.

*To all whom it may concern:*

Be it known that I, WESLEY ANDERLE, of North Liberty, in the county of Johnson and State of Iowa, have invented certain new and useful Improvements in Draft-Equalizers or Three-Horse Whiffletrees; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
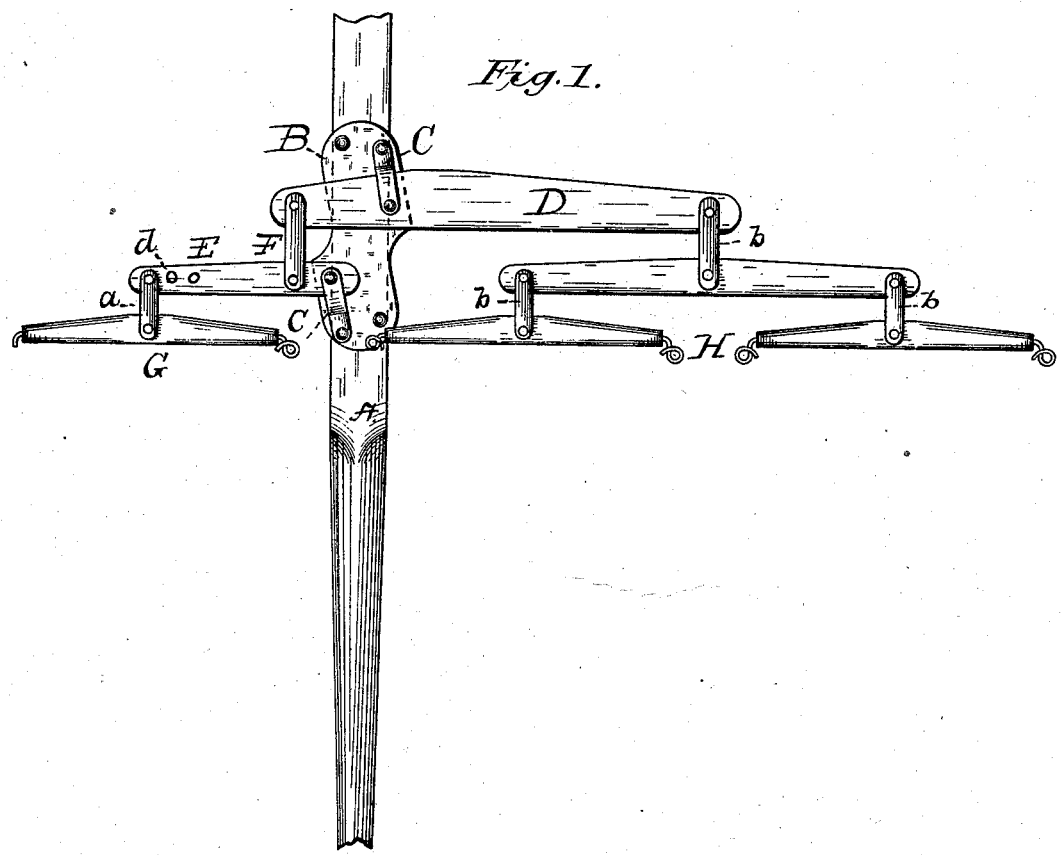
Figure 2:
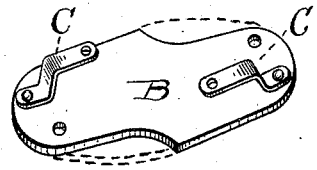

Figure 1 is a plan view of my improved draft-equalizer. Fig. 2 is a perspective view of the metallic plate to which the levers are fulcrumed.

This invention relates to draft-equalizers or whiffletrees for three horses, for equalizing the draft among the horses.

The objects of my invention are, first, to attach the whiffletrees in the same line; second, to do away with the side draft, whereby each horse shall have his portion of the work to do; and, third, the attachment of the levers to the metallic plate of the tongue to balance the trees and add firmness.

In the annexed drawings, forming a part of this specification, the letter A represents the tongue or pole of a plow, cultivator, or other agricultural implement or farm vehicle.

To the rear upper surface of the tongue or pole is secured centrally, by means of bolts or rivets, the metallic plate B. To this metallic plate, on its upper surface, at the forward and rear ends, diagonally arranged, are the raised straps C C.

To the rear strap C of the metallic plate is pivoted the integral transverse lever D, resting upon the surface of the metallic plate.

The lever E is pivoted at its inner end to the metallic plate and the front strap C, substantially as shown in Fig. 1 of the drawings. This lever E is connected to the lever D at its inner end by means of the upper and under links F. At the outer end of this lever E is arranged the single-tree G by means of the links a. Arranged at the farther end of the lever D is a double-tree, H, connected by links b, substantially as shown in Fig. 1 of the drawings. A series of holes, d, are arranged in the end of said lever E, to permit a change of the point of attachment of the single-tree G.

It will be observed by reference to the drawings that by my method of constructing and arranging the parts I secure levers of the first and second classes, the lever of the first class being attached to the double-tree, and the lever of the second class being attached to the single-tree. It will thus be understood by my improvement that if one of the horses in the team is stronger than the others he will not be forced to draw any more than an equal portion of the load, and the horse that lags behind has not to pull the heaviest portion of the load. As an example, if one horse is attached to the single-tree, the draft thereof is, by the lever E and links F, transmitted to the end of the lever D. Owing to the apportionment of lengths of arms of said lever, the draft of one animal is balanced against the draft of the double team. As the power of draft varies with the animal it will be seen that by changing the points of attachments by the means provided the leverage of the single-tree is changed.

I am aware that a draft-equalizer for three horses, consisting of a long lever having double-trees and a short lever having a single-tree attached at different points to the tongue, as shown in the patent of J. Branning, No. 204,289, dated May 28, 1878, is not new, and therefore no broad claim is made to a three-horse draft-equalizer in this application; but

What I claim as my invention, and desire to secure by Letters Patent, is—

1. The wear-plate hereinbefore described for a draft-equalizer, consisting of the oblong-shaped metallic plate B and the raised metallic straps C C, riveted to the opposite diagonal corners of the plate, as and for the purpose set forth.

2. The improved three-horse draft-equalizer hereinbefore described, consisting of a tongue, the metallic plate B, with the diagonally-arranged straps C C, the long lever D, pivoted to the rear end of the plate and carrying the single-tree G, said trees being arranged in the same horizontal line, as shown and described.

In testimony that I claim the foregoing I have hereunto set my hand this 29th day of December, 1879.

WESLEY ANDERLE.

Witnesses:
JOHN W. ANDERLE,
A. L. MORELAND.